June 22, 1954  H. L. STOVER  2,681,804
CHANCE CONTROLLED GAME APPARATUS
Filed Sept. 22, 1952  2 Sheets-Sheet 1
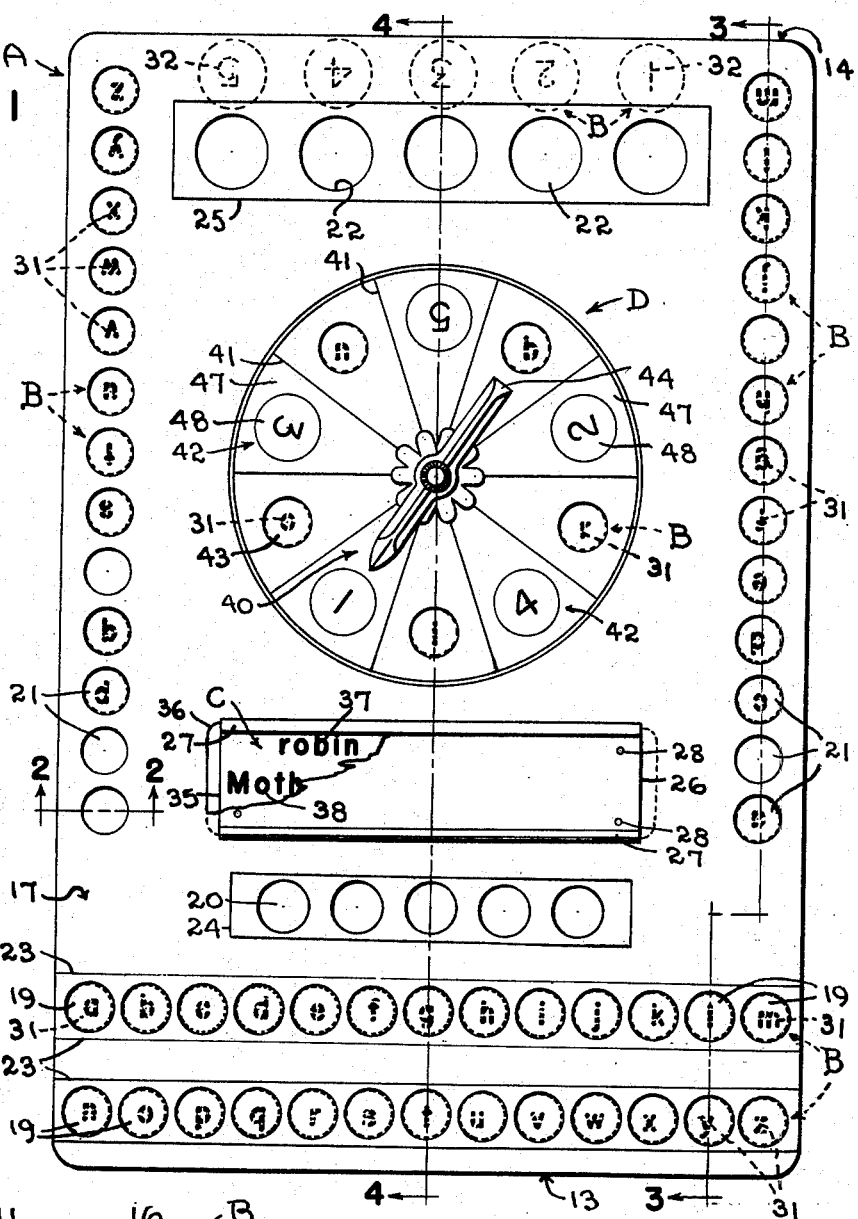
FIG. 1
FIG. 2
Inventor
Howard L. Stover
By 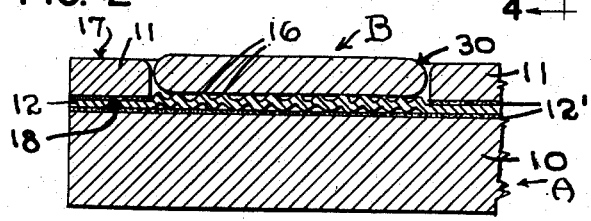
Attorneys June 22, 1954    H. L. STOVER    2,681,804
CHANCE CONTROLLED GAME APPARATUS
Filed Sept. 22, 1952    2 Sheets-Sheet 2
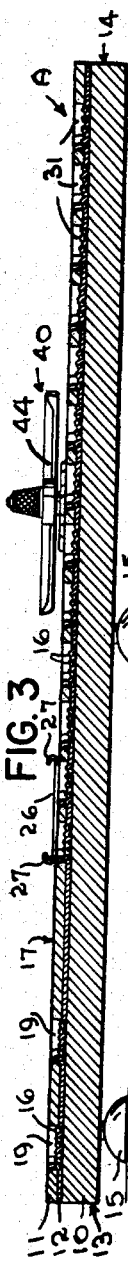
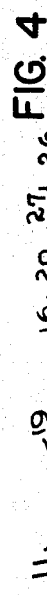
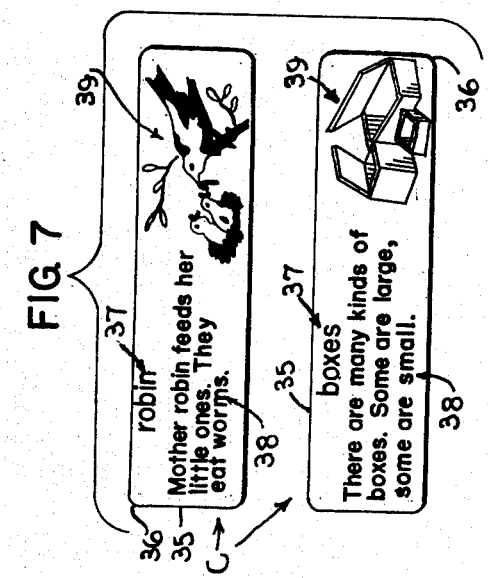
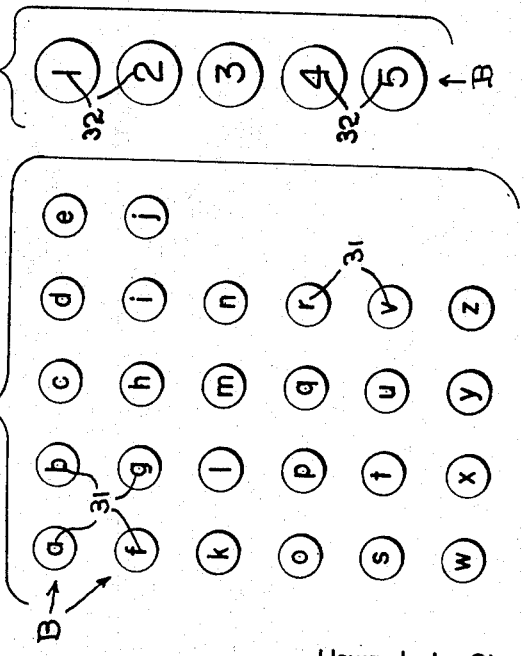
Inventor
Howard L. Stover
By
Attorneys though wherever the ply 12 forms the bottoms of the pockets or spaces 19, 20, 21 and 22 the ply 12 retains its irregular upper surface formed by the resilient ribs 16.

UNITED STATES PATENT OFFICE 2,681,804

CHANCE CONTROLLED GAME APPARATUS

Howard L. Stover, Philadelphia, Pa.

Application September 22, 1952, Serial No. 310,805

6 Claims. (Cl. 273—135)

This invention relates to educational games.

An important object of the invention is to provide an educational game which may be played by a child and an older person and is shown as adapted to teach the child to build words and associate the words with a suitable picture, preferably selected by the child. The older person does not compete with the child in building the words and the efforts of the older person neither aids nor hampers the child in word building. However, there is a decided chance element to the game, with this element shared equally by child and older person.

Another important object is to provide an educational game, which includes a child as a player, and embodies a game board, having spaces for word-spelling and other game pieces arranged in a dual-purpose manner.

Furthermore an important object is to provide an educational game which may have, as players, a child and an older person, with the game including a game board, a chance-controlled device, indicia-containing game pieces, some of which are for association with the chance-controlled device, and a member containing indicia (as a word) bearing a relationship to that upon some of the game pieces, and to guide the child to spell out and learn words and associate the words with picture indicia upon the member.

Another important object is to provide a game including a chance-controlled device which, as the game progresses, is altered in order to continue the game and render it more interesting.

Furthermore, an object of the invention is to provide a game, including a game board which is especially constructed and arranged for use by a child and an older person.

Additionally, an object is to provide a game which is not complicated and may be readily understood by a child.

Other objects and advantages of the invention will be apparent during the course of the following detailed description of the invention, taken in connection with the accompanying drawings, forming a part of this disclosure, and in which drawings:

Fig. 1 is a top plan of the game board, chance controlled device and means to removably retain an indicia-bearing member, shown in fragmentary elevation, and which is associated with the game pieces, shown in dashes.

Fig. 2 is a vertical transverse section, on an enlarged scale, substantially on the line 2—2 of Fig. 1, with a game piece shown in plane.

Figs. 3 and 4 are vertical longitudinal sections, substantially on their respective lines of Fig. 1.

Fig. 5 is a top plan of one of two like sets of game pieces.

Fig. 6 is a top plan of another set of game pieces.

Fig. 7 is a top plan of two examples of indicia-bearing members adapted to be removably retained by the means shown in Figs. 1, 3 and 4.

In the drawings, wherein for the purpose of illustration is shown a preferred embodiment of the invention and wherein similar reference characters designate corresponding parts throughout the several views, the game apparatus comprises a game board A, game pieces B, indicia-bearing members or cards C for association with some of the game pieces, and a chance controlled device D.

The game board A is preferably a substantially flat structure which may be made up of three plies, consisting of a bottom ply 10, uppermost ply 11 and intermediate ply 12, secured together in any approved way, as by glue 12', to provide a preferably rectangular structure, which may be rounded at the corners and providing substantially parallel sides and substantially parallel ends. One end 13 may be termed the child-facing end and the other end 14, the older person facing end. The structure described may be mounted upon suitable supports, such as spaced-apart feet 15, which may be of solid rubber, sponge rubber, or rubber suction cups, secured to the bottom ply 10 to extend downwardly therefrom with the larger ends of the legs facing downwardly and adapted to contact any suitable support.

The plies 10 and 11 may be substantially rigid and be, for example, of hardened plastic, fibre board or metal. I have discovered a novel material for the intermediate ply 12, consisting of a good tough grade of crinkled paper or lightweight corrugated board, providing an irregular surface such as embodying a plurality of resilient ribs 16. It is preferred that the color of this ply 12 be quite different from that of the upper face of the ply 11, to provide contrast. Green is suggested for the ply 12 and light yellow for the ply 11.

Referring mainly to Figs. 1, 3 and 4, it will be seen that the uppermost ply 11 is provided with a plurality of cut-outs, extending through the ply 11 from its outer face 17 to its under face 18 and, with associated portions of the ply 12, providing a plurality of pockets or spaces 19, 20, 21 and 22.

By pressure gluing the three plies 10, 11 and 12 together, the ply 12 will be flattened out, except where it forms the bottoms of the pockets or spaces 19, 20, 21 and 22.

Preferably, the pockets or spaces 19 are arranged in rows (as two rows) transversely of the board and next adjacent the end 13, and the rows may be separated by border lines 23, which may be printed, indented or etched. It is preferred that there be twenty-six pockets 19 corresponding to the number of letters of the English alphabet. The reasons for arranging the pockets or spaces 19 as described are so that they will be close to the child (as some of the pockets of longitudinally extending rows would be) and more readily seen and the game pieces extracted. Also, since they differ in arrangement over that of the pockets or spaces 21, the child will be apt to quickly recognize his end of the game board A.

In the example shown, there are five pockets 20 arranged in a single row inwardly of the pockets 19 and enclosed by a box 24, the lines of which may be printed, indented or etched. The number of pockets 20 may vary but it has been discovered that five-letter words are desirable. The spaces or pockets 19 and 20 are disposed in one defined space-containing portion adjacent the end 13.

The pockets or spaces 21 may be arranged in two parallel longitudinal rows adjacent the side edges of the board and there are, preferably, twenty-six pockets 21. The reasons for arranging the pockets 21 as described are two-fold. They are out of the way of the central area of the board, so that there will be ample room for the chance controlled device D in the center of the board and within reach of the child, and the difference in arrangement over those of the pockets 19 is a visual aid to the child in recognizing which end of the board is his end. Of course, the older person, having a longer reach and looking down upon the board from a greater altitude, is not handicapped by the elongated rows of pockets 21.

Arranged inwardly of the edge 14, and preferably within box lines 25, is a transverse row of pockets or spaces 22, preferably five in number, and the pockets 21 and 22 are disposed in a second defined space-containing portion opposite the first defined space-containing portion.

The mouths of all pockets may be rounded if desired.

Suitably mounted upon the ply 11, to extend over a portion of its outer face is means to removably retain a card or member, which may be a metallic or plastic sheet 26 having turned over longitudinal edge portions 27. It may be secured to the ply 11 as by tacks 28, and be disposed inwardly of the row of pockets 20.

The game pieces B are preferably discs of any suitable material, having rounded edges 30. They may be formed of the material punched out to provide the several pockets or be otherwise provided from plastic or other material of a color or colors contrasting to that of the ply 11. Preferably, their thickness is such that they project slightly above the plane of the outer face of the ply 11, as in Fig. 2.

There are provided two sets of twenty-six each of game pieces containing the letters 31 of the English alphabet, one letter to a disc, as one of the two sets is shown in Fig. 5, and a third set of game pieces containing Arabic numerals, preferably designated by the reference character 32. For example, the numerals "1," "2," "3," "4" and "5," as shown in Fig. 6.

Two examples of indicia bearing members or cards C are shown in Fig. 7 and each may comprise an elongated flat sheet 35 with rounded corners 36 containing indicia, as a five-letter word 37, associated explanation 38, and associated illustration 39. The cards C are adapted to be slid into and out of the member holding means, guided by the edge portions 27. There may be any desired number of cards C, all being different as to indicia 37, 38 and 39.

The chance controlled device D may be any suitable one. For example, the spinning arrow means 40 associated with certain indicia 41 and 42 and pockets 43. The arrow or index 44 may be mounted for easy rotation upon a truncated conical substantially vertical pivot post 45 secured to the board A to extend upwardly from the outer face 17 of the ply 11. The post 45 may be secured as by the screw 46. The indicia 41 consists of spaced-apart lines radiating across the outer face 17 of the ply 11 from, for example, the axial center of the post 45 to form areas 47, and the indicia 42 comprises delineations of circular areas or spaces 48 within each alternate area 47 and containing a different Arabic numeral as "1," "2," "3," "4" and "5." The pockets 43 may be exactly like the pockets 21 and are contained in the areas 47 not occupied by the indicia 42.

The game may be played by the child being given one set of game pieces B containing the indicia 31 to form one English alphabet, and the pack of cards C. The child (who may be termed a first player) faces the edge 13. The older person (who may be termed a second player) retains the game pieces B of one complete alphabet and the five game pieces containing the indicia 32. The older person faces the edge 14.

One set of the alphabet-containing game pieces B is arranged in the transversely extending pockets 19 and the other set in the longitudinally-extending pockets 21, and the game pieces B, bearing the indicia 32, will be arranged in numerical sequence in the space between the pockets 22 and edges 14, as shown in dashes in Fig. 1.

The child will then select a member C and slide it into the member retaining means, whereupon the older person selects, from the longitudinally-extending pockets, the game pieces bearing the letters making up the indicia 37 upon the card C, and disposes them at random, in the pockets 43, as shown, by way of example, by dashes in Fig. 1.

Thereupon the child spins the arrow 44. If it stops at one of the five indicia 31 on the game pieces B within the pockets 43, the child will transfer a game piece bearing that one of the five indicia from the pocket 19 to its correct position in a pocket 20 which it occupies in the spelled-out word. If the arrow stops in the area 47 occupied by any of the indicia 42, or in an area occupied by a game piece containing indicium 31 similar to that of a game piece occupying a pocket 20, the child stops dialing and the older person then spins the arrow 44 and if it stops in an area 47 occupied by an indicium 42, the older person places the appropriate game piece B bearing the proper indicium 32 in its numbered pocket 22, but if the arrow stops in an area occupied by a pocket 43, or in an area occupied by indicium 42 which indicium appears on a game piece already in a pocket 22, the child resumes spinning as before. If the arrow 44 stops directly over any indicium 41, another spin of the arrow may be had.

The series of steps in the game are completed when the child has correctly filled all the pockets 20 or the older person has filled all the pockets 22, whereupon the game pieces may be replaced as at the start and a new card C selected by the child.

As the steps progress, the older person may comment upon other aspects of the indicia 37 upon the card C, thus aiding the child in a better knowledge of the word.

In the event, for economy, the struck out discs formed from the ply 11 are employed as game pieces B, after being suitably colored if desired and marked with suitable indicia, because of the ribs 16, these discs will be raised slightly above the plane of the outer face 17 of the ply 11, as in Fig. 2. In addition, the very slight resiliency of the ribs 16 enables the players to more readily tip the game pieces for extraction from the several pockets. In fact, they may be tipped up by placing the end of a finger close to the edge of the game piece or a fingernail may be inserted between the wall of the pocket and game piece. Of course, if the game pieces B are not the struck out discs mentioned, it is desirable that their thickness be such that they will project slightly above the plane mentioned when they are disposed within the pockets.

Various changes may be made to the form of the invention herein shown and described without departing from the spirit of the invention or scope of the claims.

I claim:

1. An educational game including a board having a first space-containing portion, a second space-containing portion opposite the first portion, with the spaces of the first portion extending in substantially parallel rows in front of and to the left and right of a first player, and the spaces of the second portion extending in a first row in front of a second player, and extending in a second row toward and away from said second player and toward the first rows; two sets of game pieces, each game piece of each set containing a different indicium from the indicium of any other of said game pieces of the set, and the indicia of the two sets being duplicates, the game pieces of one of said sets being constructed to be disposed upon the spaces of said second row, and the game pieces of the other set being constructed to be disposed upon the spaces of said parallel rows; a third set of game pieces bearing indicia differing from that of the indicia upon the other game pieces and with each game piece of said third set bearing a different indicium, said game pieces of said third set being constructed to be disposed upon the spaces of said first row, the number of spaces of said parallel rows being greater than the number of game pieces of said other set; a chance controlled device carried by said board including a plurality of spaces, some of the last-named spaces being constructed to accommodate selected game pieces of said second set, and the other of said spaces last-named bearing indicia corresponding to the indicia upon the game pieces of said third set; and a member, carried upon said board, having indicia thereon bearing a relationship to the indicia upon selected of the game pieces of said first and second sets.

2. An educational game according to claim 1 characterized in that said game board has side and end edges, said parallel rows extend toward the side edges, said second row extends toward the end edges, and said member is elongated with its longitudinal axis substantially paralleling the longitudinal axes of said parallel rows.

3. An educational game according to claim 1 characterized in that said game board has side and end edges, said parallel rows extend toward the side edges, said second row extends toward the end edges, and said member is elongated with its longitudinal axis substantially paralleling the longitudinal axes of said parallel rows and is removably carried by said board.

4. An educational game including a board having end and side edges, a first space-containing portion, a second space-containing portion opposite the first portion, with the spaces of the first portion extending in substantially parallel rows in front of and to the left and right of a first player and adjacent one of said end edges, and the spaces of the second portion extending in a first row in front of a second player, and extending in two spaced-apart elongated parallel rows adjacent the side edges of said board, toward and away from said second player and toward the first rows; two sets of game pieces, each game piece of each set containing a different indicium from the indicium of any other of said game pieces of the set, and the indicia of the two sets being duplicates, the game pieces of one of said sets being constructed to be disposed upon the spaces of said elongated parallel rows, and the game pieces of the other set being constructed to be disposed upon the spaces of the first-named parallel rows; a third set of game pieces bearing indicia differing from that of the indicia upon the other game pieces and with each game piece of said third set bearing a different indicium, said game pieces of said third set being constructed to be disposed upon the spaces of said first row, the number of spaces of said first-named parallel rows being greater than the number of game pieces of said other set; a chance controlled device carried by said board including a plurality of spaces, some of the last-named spaces being constructed to accommodate selected game pieces of said second set, and the other of said spaces last-named bearing indicia corresponding to the indicia upon the game pieces of said third set; and a member, carried upon said board, having indicia thereon bearing a relationship to the indicia upon selected of the game pieces of said first and second sets.

5. An educational game according to claim 4 characterized in that said indicia upon said two sets consists of the letters of the English alphabet with one letter to a game piece, the indicia upon the game pieces of the third set having Arabic numerals, one numeral to a game piece; and the indicia upon said member including a word consisting of letters of the English alphabet, and a pictorial representation of said word.

6. An educational game according to claim 4 characterized in that said indicia upon said two sets consists of the letters of the English alphabet with one letter to a game piece, the indicia upon the game pieces of the third set having Arabic numerals, one numeral to a game piece, and the indicia upon said member including a word consisting of letters of the English alphabet.

References Cited in the file of this patent

UNITED STATES PATENTS

| Number | Name | Date |
|---|---|---|
| 1,595,285 | Bevan | Aug. 10, 1926 |
| 1,621,185 | Bain | Mar. 15, 1927 |
| 1,818,012 | Smith | Aug. 11, 1931 |
| 2,521,775 | Brower | Sept. 12, 1950 |